United States Patent [19]  [11] Patent Number: 4,571,648
Barski  [45] Date of Patent: Feb. 18, 1986

[54] DEVICE FOR LOADING THE MAIN BODY OF A PLATFORM CONTAINING AT LEAST ONE READ/WRITE TRANSDUCER OF A DATA MEDIUM

[75] Inventor: Guy Barski, Paris, France
[73] Assignee: Cii Honeywell Bull, Paris, France
[21] Appl. No.: 467,202
[22] Filed: Feb. 16, 1983
[30] Foreign Application Priority Data Mar. 15, 1982 [FR] France ................ 82 04349

[51] Int. Cl.⁴ .................. G11B 5/54; G11B 21/22
[52] U.S. Cl. ................................................ 360/105
[58] Field of Search .......................... 360/105–106

[56] References Cited
U.S. PATENT DOCUMENTS 3,646,536  2/1972  Bleiman .................. 360/105 X
4,019,205  4/1977  Salmond ................... 360/105

Primary Examiner—S. J. Heinz
Attorney, Agent, or Firm—Kerkam, Stowell, Kondracki & Clarke

[57] ABSTRACT

An actuator for loading the main body of a platform having at least one read/write transducer associated with a data medium comprising at least one rigid movable arm (4), a flexible spring plate (10) attached to the rigid arm at one of its ends and supporting the platform (12) at its other end, the flexible plate (10) generating a force for pressing the main body against the data medium (14). The actuator is characterized in that flexible plates (10) are arranged in pairs, and means are provided for acting simultaneously upon the ends of two flexible plates (10) in order to bring them closer together. The means for acting simultaneously on the ends of two flexible plates are formed by two inclined cam profiles which act on a edge of a hole or slot provided in and along the central axis of each flexible plate and by means for shifting these cam profiles in relation to the edges of the flexible plates. The cam profile exerts on the flexible plate an action which can be broken up into a component force in the direction of the flexible plate and a component force perpendicular thereto. The first component force comes into equilibrium by the reaction of a fixed support. The second component force produces the desired effect of bringing the two flexible plates closer together.

13 Claims, 7 Drawing Figures

DEVICE FOR LOADING THE MAIN BODY OF A PLATFORM CONTAINING AT LEAST ONE READ/WRITE TRANSDUCER OF A DATA MEDIUM

BACKGROUND OF THE INVENTION

Field of the Invention

The present invention relates to a device or support for loading the main body of a platform containing at least one read/write transducer of a data storage medium.

The invention relates generally to the field of magnetic disc storage. Magnetic disc or data storage elements are well known in the data processing field. As a rule, one or more discs are provided, each having a magnetic coating and being mounted on a control unit for recording data on the disc and/or for reading data from the disc and updating data, as required. When the storage arrangement has several discs, they are superimposed and have the same axis of rotation. Data is written on concentric tracks on the discs by read/write transducers which move on their surface.

The read/write transducers are supported by a platform which is radially displaced above the surface of the disc by means of a linear or rotary actuator, so that the transducers can access any data contained thereon. The platform proper consists of two essential parts: one part called the "main body" of the platform which contains the transducer, and another or second part called a suspension mechanism, one end of which is secured to the main body and the other end is attached to a removable rigid arm.

The transducers contain input and/or output electrical connecting wires connected to the electronic write and/or read circuits of the disc storage with which they are associated for carrying signals to and from the disc.

Generally, the main body of a platform has the form of a relatively flat rectangular parallelepiped, whose lower face contains the transducers for reading and/or recording the data. The large upper face contains the ends of the electrical input and/or output wires connected to the transducers and the means enabling these wires to be connected to electronic read and/or write circuits of the disc storage.

In current practice, the lower face of the main body contains one or more channels having a depth which may attain several tenths of a millimeter, resulting in the existence on this face of a plurality of projecting parts called "skids" generally in the shape of a ski.

A platform of this type is illustrated and described in U.S. Pat. No. 4,261,024 issued on Apr. 7, 1981 and entitled "Transducer". Reference may also be made to U.S. Pat. No. 4,225,891, issued on Sept. 30, 1980; U.S. Pat. No. 4,280,156 issued on July 21, 1981; and U.S. application Ser. No. 197,340, filed Oct. 15, 1980, now abandoned, for other illustrations and descriptions related to platforms of this type. The latter patents and application are all assigned to the assignee of the present invention.

The rotation of the discs leads to the existence between the lower face of the main body of the platform and the face of the disc associated therewith of a cushion of compressed air which prevents the main body from touching and, thus, from damaging the disc. It is then said that the main body and, by extension, the platform, flies above the face of the disc which is associated therewith at a distance of a few tenths of a micron. This distance between the face of the main body opposite the disc and the disc proper is called the flight attitude.

The cushion of air exerts a compressive force on the surface of the skids in a direction normal thereto and directed from the lower face to the upper face of the main body of the platform. When in flight, the dynamic equilibrium of the platform is achieved by setting up, in opposition to the force generated by the pressure of the air cushion against the surface of the skids, a force called the "loading force", which is applied to the upper face of the main body and has a modulus equal to that of the compressive force.

The loading force is usually generated by a prestressed spring secured to the rigid arm of the actuator supporting the platform. This loading force is relatively small and is of the order of 10 to 20 grams.

However, a delicate problem to be resolved with respect to supporting the platform is that of "flying" the main body. When the disc storage is not operating, the main body of the platform is positioned near the periphery of the disc and beyond said surface. This position is called the "rest position". The expression "flight stage" means the transitory stage during which the main body moves from its rest position until the moment when it is in stable flight a few tenths of a micron above the surface of the disc. This flight stage is a delicate condition mainly due to the air turbulence near the surface of the disc, particularly when the storage contains several discs.

The area defined by two circles concentric to the disc, one passing through the position of rest of the main body and the other through the point on the surface of a disc where this main body is in a stable flight, is called the "area of approach" or "putting into flight area". It is in this area that the main body descends toward the plane of the disc until it attains the flight altitude.

Devices are known in the art for loading magnetic heads for discs which contain a rigid removable arm, to which a flexible loading spring plate is affixed. In the free state, this spring plate is curved. It supports the platform at its end. The curve of the flexible spring plate is determined such as to generate a force applying the magnetic head to the disk.

The problem to be solved consists in bending the flexible plate supporting the head while the actuator is moving, radially or at an angle, depending on the case, as far as the read area of the disc and in easing this bending gradually until the loading force exerted by the flexible plate forming the spring is balanced by the cushion of compressed air which forms dynamically under the skids of the read head.

In a device of known construction, the flexible spring plate contains two symmetrical ramps which coact with stationary supports mounted on the frame and which act as a cam profile with respect to the symmetrical ramps so as to raise or to lower the flexible plate when the removable arm is shifted in relation to the disc. This loads or unloads the read/write head.

The present tendency in magnetic storage arrangements is to decrease the space occupied by the disc memories, making it possible to miniaturize the devices for loading the main bodies of the platforms. It is difficult to miniaturize prior art loading devices such as those described hereinabove.

SUMMARY OF THE INVENTION

The present invention relates specifically to a device for loading the main body of a platform comprising at least one read/write transducer of a data medium which is readily adaptable for miniaturization. This device includes at least one rigid removable arm, a flexible spring plate affixed to the rigid arm at one of its ends and supporting, at its other end, a platform consisting of a main body and a suspension mechanism. The flexible plate generates a force which loads the main body on the data medium. The invention is characterized in that flexible plates are mounted in pairs and in that the device has means for acting simultaneously on the ends of the two flexible plates so as to bring them closer together.

This loading device can be applied both to a rotary actuator and to a linear one, but a rotary actuator is the preferred embodiment. With a rotary actuator, it is necessary to provide for the shifting of the rotary arm and there is no space required for the installation of the stationary supports mounted on the frame required with a linear actuator. It will be understood, of course, that a single ramp can be used, but the light weight and the elasticity of the flexible plate make this solution undesirable, because the torque thus exerted on the flexible plate would make it twist.

BRIEF DESCRIPTION OF THE DRAWINGS

The nature of the invention and the various features of the appearance will be more readily understood by reference to the description of preferred embodiments given hereinbelow in conjunction with the accompanying drawings, in which.

DESCRIPTION OF THE PREFERRED EMBODIMENTS

Figure 1:
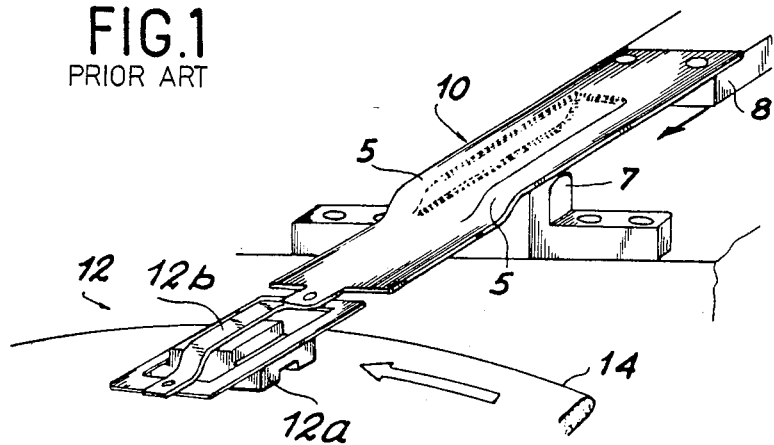
FIG. 1 is a perspective view of a linear actuator of known construction.
Figure 2A:
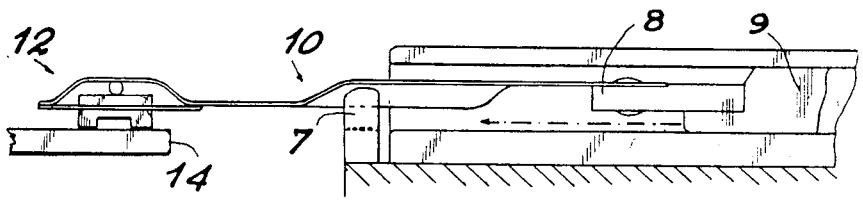
FIGS. 2a and 2b illustrate the operation of the apparatus of FIG. 1.
Figure 2B:
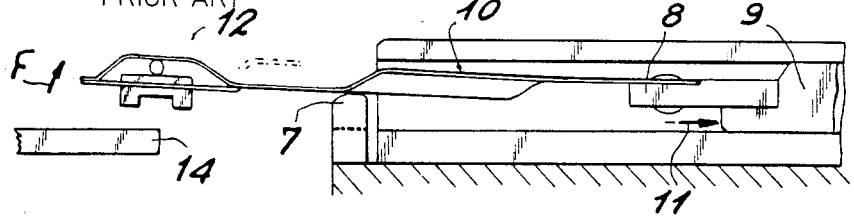

FIG. 1 is a perspective view of a device for loading magnetic heads of known construction. It consists of a support 8 secured to a rigid arm 9 (FIGS. 2a and 2b). The rigid arm itself is shifted in translation by means of a linear actuator moved by an electric motor. A flexible spring plate 10 is secured to the support 8. This flexible plate 10 contains two symmetrical ramps 5. At its end, it supports a platform 12. This platform 12 consists of a main body 12a and a suspension mechanism 12b. The main body 12a contains at least one read/write transducer operatively connected to enable data to be read or written into the magnetic disc 14.

The device also has two stationary supports 7 mounted on the frame. These supports cooperate with the ramps 5.

FIG. 2 shows the operation of this device. In FIG. 2, the head 12 is in the "fly" position. The plate 10 exerts a force pressing the head 12 against the disk 14. There is no contact between the plate 10 and the two supports 7.

FIG. 2B shows the raising of the read head. To do this, the rigid support arm is shifted in translation in the direction of the arrows and, thus, of the support 8 carrying the flexible plate 10. The two symmetrical arms 5 forming the cam profile are then raised onto the stationary supports 7 which, in turn, lifts the platform 12 in the direction of the arrow f above the plane of the disk 14.

Flying of the read head occurs upon shift of the arm in the opposite direction, advancing the linear slide toward the disc. The two symmetrical ramps 5 then are lowered toward the supports 7. As the platform 12 approaches the face of the disc 14, the lift of the platform increases progressively. When the head has reached proper flight height, the loading force generated by the flexible plate 10 is fully balanced by the lift of the platform or read head. At that moment, there is no more contact between the flexible plate and the two supports 7.

Figure 3:
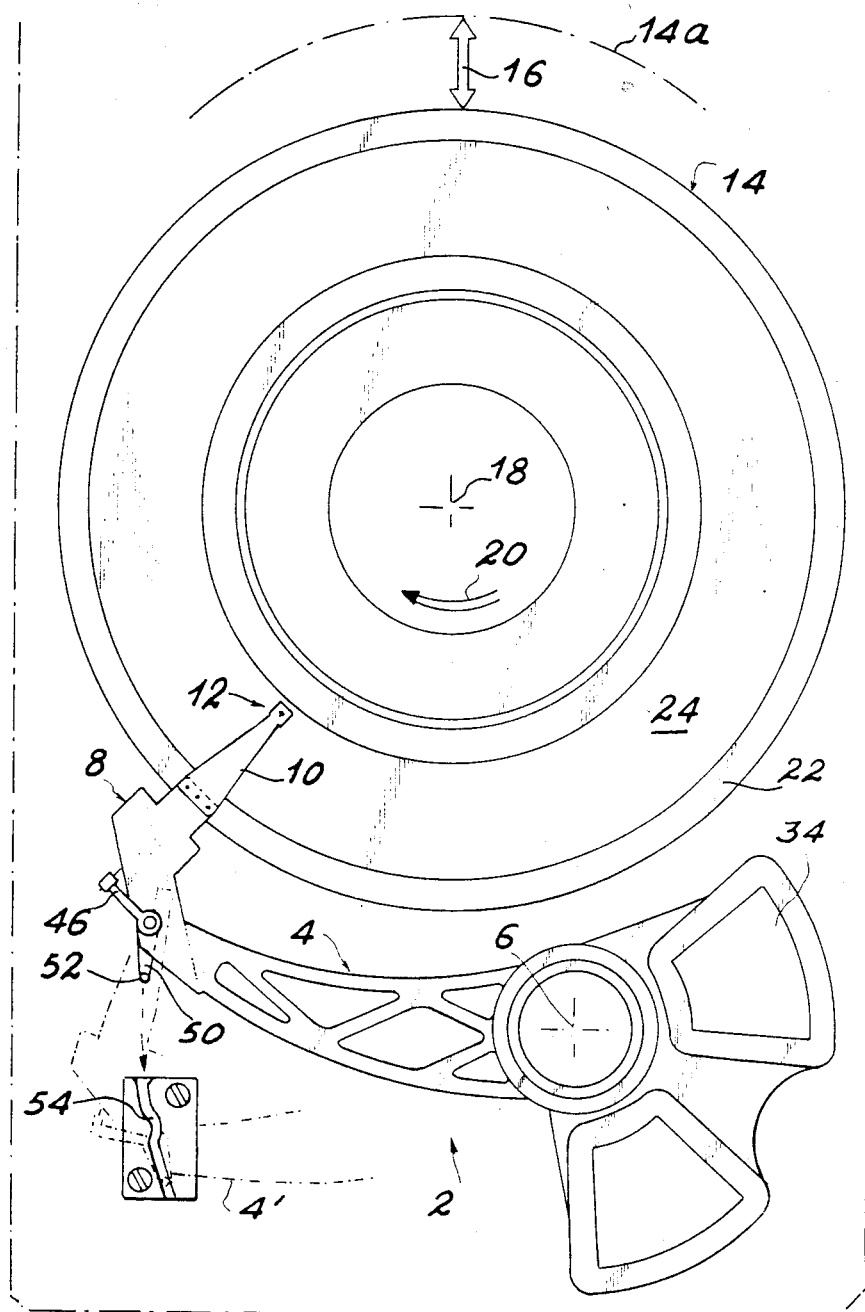
FIG. 3 shows a top view of a rotary actuator supporting a loading system embodying the invention.

FIG. 3 shows a rotary actuator supporting a loading device embodying the invention.

Figure 4:
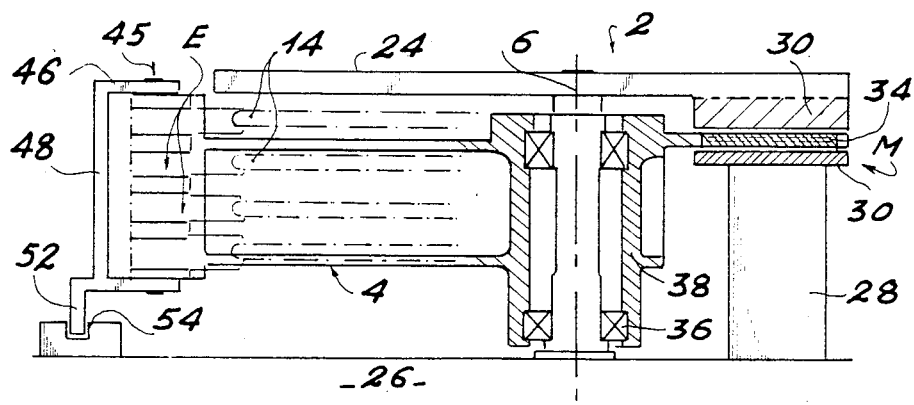
FIG. 4 shows a longitudinal section of the rotary arm illustrated in FIG. 3.

The actuator illustrated in FIG. 3 has been denoted by the reference numeral 2. It consists of an arm 4 and a drive motor M (FIG. 4). The arm 4 rotates about a vertical axis 6.

A rotary arm, such as arm 4, permits the inertia of the actuator in relation to that of a linear actuator to be decreased by a factor of 10. In order to reduce this inertia still further, the arm is structured like a thin cast perforated box made of an alloy, resulting in a very light and very rigid structure.

At the end of arm 4 there is fixed at least one support 8 which carries two flexible plates 10 mounted on both sides, only one of which, the upper plate, can be seen in FIG. 3. At the end of the flexible plates there is located a read/write head similar to that shown in FIGS. 1 and 2, whose main body 12a has at least one transducer for reading/writing data contained on the magnetic disc 14.

Every face 15 of a disc has a transducer associated therewith. In the ensuing description, the expression "face of the disc" will imply the association of the latter with a transducer. The main body is mounted on a universal joint consisting of a central roller bearing such that self-positions in relation to the cushion of air existing between it and the disc. The disc 14 is removable, as shown schematically by the arrow 16 in FIG. 3. The dash-dot line 14a schematizes the outer contour of disk 14 while being introduced or raised. Once it has been put in place, disc 14 is made integral with a drive means about the vertical axis 18 in the direction of arrow 20. A constant rotational speed of, say, 3600 rpm, may be maintained for the read/write operations.

The flight zone in which the main body starts from its rest position is then lowered toward the plane of the disc until it reaches its flight altitude. This has been denoted by the reference numeral 22. The main body 12 includes skids (not shown) under which enters the air which is set in motion by rotation of the disc. This keeps the main body at a predetermined altitude above the disc's plane. This altitude is called the flight altitude. In the case of the specific embodiment shown, it is 0.3 micron.

The details of the platform need not be shown for an understanding of the invention since such details are known, as shown, for example, in the aforenoted patents. It is sufficient for the present description merely to note from FIGS. 1 and 2 that the platform 12 consists of a main body 12a and a suspension mechanism 12b. In FIGS. 3 through 6 and in the following corresponding description, the main body has been designated by the reference numeral 12.

The arm 10 is made of a flexible metal plate which functions as a spring. It exerts a certain force which presses the main body against the disk. This force can vary between 10 to 30 grams, depending on the applications.

As can be seen in FIG. 4, the actuator is mounted in a counter-inertia stirrup piece consisting of an upper plate 24 and a lower thick steel plate 26. This stirrup piece is provided with permanent magnets 28 and with pole plates 30 of the motor M. The two pole plates 30 determine the air gap.

The motor (M) coils (34) are encased by a vacuum-packed polycarbonate and supported to move in the air gap.

The bearing 36 forms a swivelling axis 6 for the loading device and consists of two prestressed deep-groove ball bearings 36 arranged so as to cancel out any inadmissible clearance.

The solid parts of the arm 4, like the recess 38 in which the two roller bearings 36 are housed, are located near the swivel axis 6. Thus, their moment of inertia in relation to this axis is small. Moreover, these masses allow for the counterbalancing of the arm. As can be seen from FIGS. 4 and 5, the arm 4 supports at one end several main bodies whose transducers enable data to be written or read on several tracks. In the example shown, there are 4 superimposed discs 14. The platforms and the flexible arm 10 are inserted between the discs during the swivelling of the rotary arm 14. Rotary arm 14 has been shown in the reading position in FIG. 3 and has been schematized by a dash-dot line in the retracted position at 4'.

When the arm 4 is in the retracted position 4', the flexible plates 10 are at rest. When the plates 10 are inserted between the discs in the read position, they exert a predetermined force, pressing the main body 12 against the plane or surface of the disc. To enable the main bodies to be inserted between the discs, it is thus necessary to bring them together so that they can penetrate between the discs without knocking there-against.

As mentioned earlier, the devices of known construction, particularly those having a linear actuator, are equipped with two symmetrical ramps located on both sides of the flexible arms. These ramps press the main body against the disc surface.

The invention provides a device for loading the main bodies of platforms of a different type which can be used with a rotary arm, such as arm 4. However, this device can also be used with a linear arm.

The inventive concept underlying the invention is to arrange the arms in pairs, as can be seen in FIG. 4, so that they act simultaneously on the ends of two flexible plates in order to bring them closer together. In this way, the reactions perpendicular to the plane of the plate come into equilibrium and it is no longer necessary to provide for a stationary support such as the support 7 shown in FIG. 1.

The means for acting simultaneously on the ends of two flexible plates are formed, in accordance with the teachings of the present invention, by two inclined cam profiles 40 which act on an edge of each of a pair of flexible plates 10, 10' and by means for shifting these cam profiles in relation to the edges of the flexible plates. The cam profile exerts on the flexible plates an action which can be broken up into a component force in the direction of the flexible plates and a component force perpendicular thereto. The first component force comes into equilibrium by the reaction of the support 8. The second component force produces the desired effect of bringing the two flexible 10, 10' plates closer together.

Figure 5:
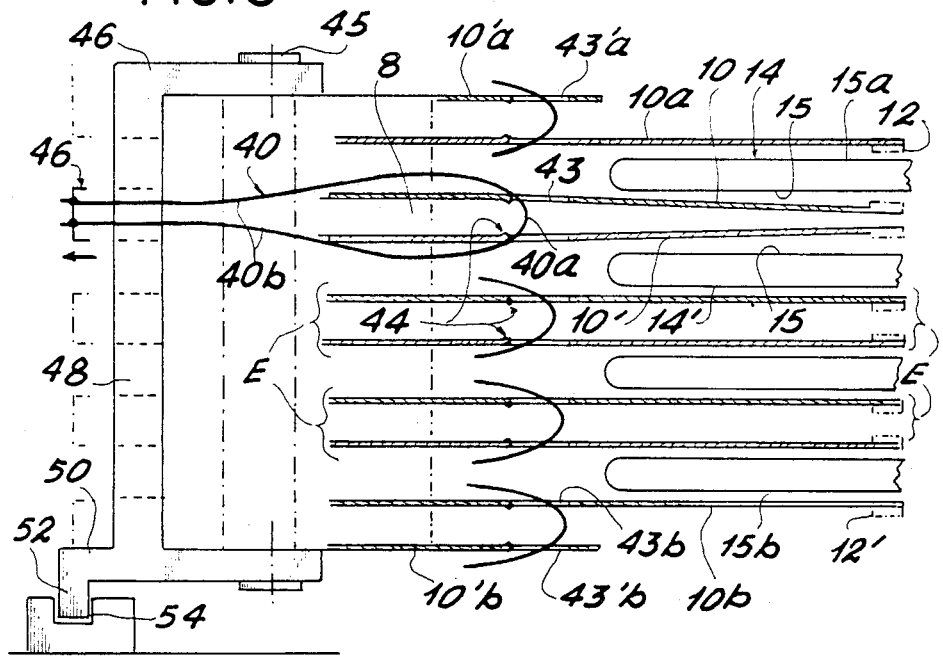
FIG. 5 shows means according to the invention which enable the read heads to fly.

As can be seen in FIG. 5, the inclined cam profiles are formed by a fine steel wire 40 which forms a loop. The wire 40 is placed along the axis of the flexible plates 10 and 10'. The end 40a of the loop is passed through two button holes or slots 43 provided along the axis of the flexible plates 10 and 10'. The end 40a functions as a cam by pressing against the rims or edges 44 of the button holes 43. However, instead of the wire 40, any other means with identical function, such as a belt or hook, may by utilized.

When a tractive effort is exerted on the ends 40b of the steel wire 40, the two plates 10 and 10' are flexed, so that the main bodies 12 and 12' are brought closer together. In this way, they can be inserted into the space separating the two discs 14 and 14' with which they are associated. This space is called the interdisc space E. In the example described, it is 5 mm long.

In this way, the main bodies 12 and 12' can be inserted into the interdisc space E without knocking against the periphery of the disc when they are being inserted. Once the main bodies have been introduced into the interdisc space, the tractive effort on the ends 40b is eased gradually, so that they come progressively closer to the faces of the disc 15 and 15', with which they are associated.

In the lower part of FIG. 5, a wire loop 40 is shown in the slackened state. The tractive effort or force on the ends 40b is zero. Therefore, the wire 40 no longer exerts any strain on the rims or edges 44 of the button holes 43 of the two associated plates. Nevertheless, the plates have not fully returned to their free positions, because it is their flexure that determines the load of the main bodies. In this position, the main bodies fly at an altitude of a few tenths of a micron above the face of the disc with which they are associated. The push exerted on the skids of the main bodies by the cushion of air caused by the rotation of the disc brings into equilibrium the load force created by the flexible plates. In this position, the placing into flight of the main bodies is completed.

It will be understood that the loading device can also be applied to the outer discs, more specifically to the upper face 15a of the disc placed above the disc pack and to the lower face of the disc 15b arranged therebelow. These two faces 15a and 15b form a special case, because the main bodies 12 and 12' with which they are associated do not form part of a pair such as the main bodies 12 and 12' associated with the intermediate or inward discs. Likewise, the flexible plates 10a and 10b for carrying transducers are not required; however, two partial flexible plates 10'a and 10'b are provided which are associated, respectively with plates 10a and 10b. These plates are shorter because they do not carry the main bodies or transducers. Nevertheless, they each comprise a button hole provided in their shaft 43'a and 43'b, respectively, into which are inserted wires 40 (not shown in order not to clutter the figure), which act exactly in the same manner as the wires 40 described for the pairs 12 and 12'. Thus, these means permit the main bodies 12 and 12' to be put into flight.

The loading device described hereinabove can be miniaturized much more easily than a prior art device comprising two symmetrical ramps. As a matter of fact, as the dimensions of the flexible plates 10 are reduced, it becomes increasingly difficult to construct the two ramps 5, because the width of the plate diminishes.

The loading device embodying the invention comprises novel and improved means for acting on the ends of the plates. These means are located in the shaft of each plate 10 and requires much less space than ramps of known construction. In particular, when these means are formed by a wire passed in a loop into two button holes made in the shaft of each plate, the dimensions of the plates can be reduced considerably without difficulty. This permits the reduction in the dimensions of the loading device and, thus, in the interdisc space and, consequently, in the space required by the memory proper.

Figure 6:
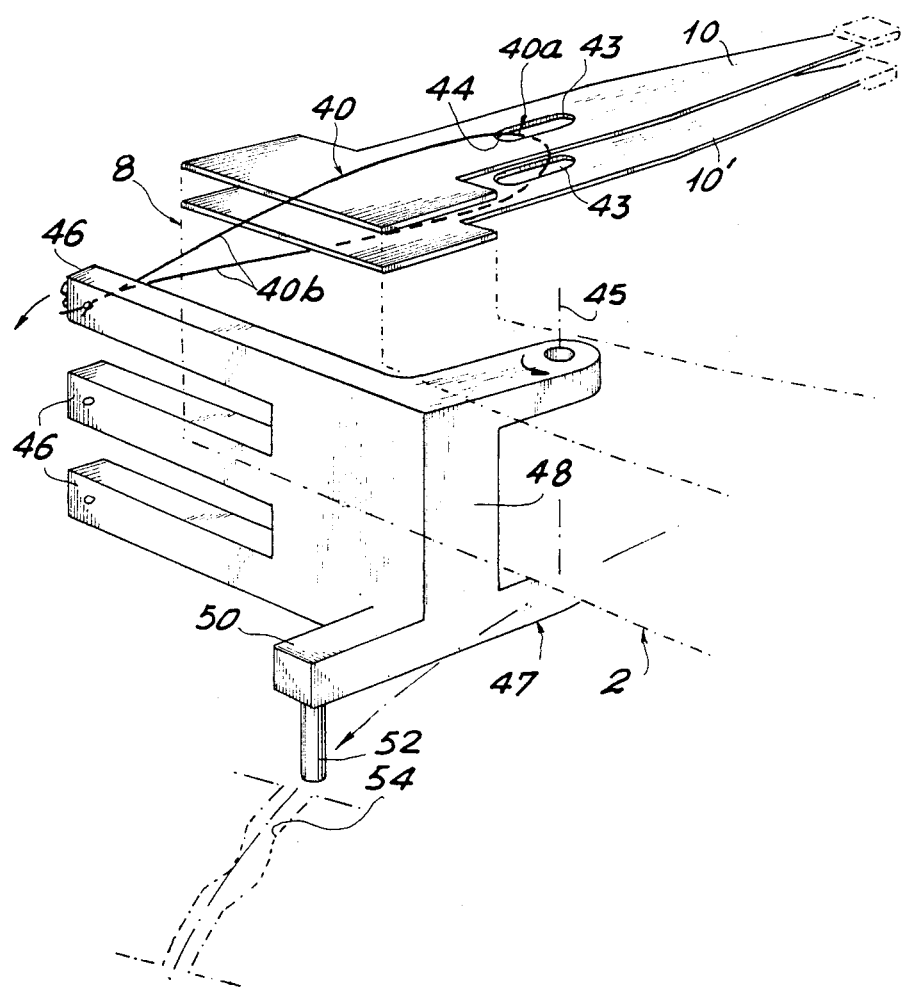
FIG. 6 is a perspective view of the means enabling the read heads to fly.

The invention also relates to means for exerting a tractive effort on the ends 40b of the loops 40. These means are formed by a bridge 47 shown in a perspective view in FIG. 6. The bridge 47 is mounted at the end of arm 40 opposite the end that supports the main body and swings around a vertical axis 45. The bridge 47 comprises a plurality of horizontal levers 45 or arms 46 fixed perpendicularly to its vertical branch or support post 48 (FIG. 3). There are as many levers 46 as there are loops 40. In the example shown in FIGS. 3 through 5, therefore, there are five levers 46. The ends 40b of every loop 40 are secured to the lever 46 situated at their level in any convenient fashion. For example, as shown in FIG. 6, each lever may include a channel through which the ends 40b are passed and crimped or knotted to restrict the ends from being withdrawn.

The bridge 47 also has a lever or arm 50 whose end 52 cooperates with a cam profile 54 which is integral with the actuator support. This lever 50 swivels the bridge 47 as the rotary arm 4 passes through the flight area 22 so that it exerts a tractive effort on the ends 40b of the loops 40.

To reduce the inertia of the arm, the bridge 47 is of very light construction and is made of plastic.

Preferably, the lever 50 carries at its end a downward depending lug 52. The cam profile in this case consists of a groove 54, whose shape can be seen in FIG. 1. The lug 52 moves in this groove. The shape of the groove 54 controls the velocity of approach of the main bodies 12 of the disc face through the movement of the bridge 47 and through the opening speed of the loops 40.

The unloading of the main bodies is effected in reverse order. The backward movement of the arm 4 causes the lug 52 to engage in the groove 54. The swivelling motion resulting therefrom exerts a tractive effort on the loops 40 which flatten out and then raise the main bodies above the disc surface. When the main bodies disengage from the discs, there follows a rotational motion in the opposite direction of the bridge. This motion eases the tractive effort on the wires. The flexible plates 10 and 10' return to their rest position.

I claim:

1. A device for loading a main body of a platform of the type that includes the main body and a suspension mechanism for the main body, the main body supporting a read/write transducer adapted to be operatively positioned with respect to a surface of a data medium, the device comprising a movable arm; a pair of flexible spring plates, each having a first end attached to the arm and one of the spring plates having a second end which supports the platform, said one spring plate being formed such that the second end presses the main body against the surface of the data medium; and means for deforming said one spring plate so as to cause the second end to move substantially perpendicularly away from the surface of the data medium, the deforming means comprising a wire connected to the pair of spring plates, and means for applying a force to the wire substantially parallel to the surface of the data medium.

2. The device as set forth in claim 1 wherein a button hole is provided in a shaft of each flexible spring plate, and the wire is passed in a loop through the button holes, and wherein the force applying means comprises means for applying a tractive force to ends of the wire loop.

3. The device as set forth in claim 2 wherein the means for applying a tractive force to the ends of the wire comprises a bridge mounted to rotate on the movable arm; at least one support lever secured to the bridge to which lever the ends of the wire are attached, and means for controlling the rotation of the bridge.

4. The device as set forth in claim 3 wherein the means for controlling the rotation of the bridge includes a cam lever secured to the bridge, said cam lever having an end disposed to engage a fixed cam profile secured to the device so as to swivel the bridge during movement of the arm through a flight zone of the data medium in order to apply the tractive force to the ends of the wire.

5. The loading device as set forth in claim 4 wherein the cam lever carries a lug which is movably disposed in a cam-forming groove.

6. The loading device as set forth in claim 5, wherein the shape of the cam-forming groove and the speed of opening of the loop control the velocity of approach of the main body towards the surface during movement of the bridge.

7. A device as set forth in claim 1 wherein said arm is part of a rotary actuator and a motor is included, for driving said arm.

8. A rotary actuator for loading a main body of a platform which includes a read/write transducer adapted to be positioned with respect to a surface of a data medium for reading and writing data from and on said data medium, the actuator comprising a rigid swelling arm; a pair of stacked flexible spring plates, each having a first end attached to the arm and having a second end which supports a platform adjacent to a surface of a associated one of a pair of stacked data mediums, the spring plates being formed to press the platforms against the surfaces of their associated data mediums, the surfaces of the associated data mediums being substantially parallel; and means for deforming the spring plates so as to cause the second ends to move substantially perpendicularly away from the surfaces of their associated data mediums, the deforming means comprising a wire connected to the pair of spring plates, and means for applying a force to the wire substantially parallel to the surfaces.

9. The device as set forth in claim 8, wherein a button hole is provided in each flexible spring plate along a central axis of the spring plate, the wire being passed in a loop through the two button holes, and wherein the force applying means comprises means for applying a tractive force to ends of the wire loop.

10. The device as set forth in claim 9, wherein the means for applying a tractive force to the ends of the wire comprises a bridge mounted to rotate at an end of the arm, a lever arm associated with the pair of spring plates and secured to the bridge, the lever arm having means for attaching to the ends of the wire loop associated with the pair of spring plates, and means for controlling the rotation of the bridge.

11. The device as set forth in claim 10 wherein the means for controlling the rotation of the bridge includes a cam lever secured to the bridge, said cam lever having an end disposed to engage a cam profile secured to the actuator so as to swivel the bridge during movement of the arm in a flight zone of the data medium in order to apply said tractive force to the ends of the wire.

12. The loading device as set forth in claim 11 wherein the cam lever carries at its end a lug which is movably disposed in a groove.

13. The loading device as set forth in claim 12 wherein the shape of said groove and the speed at which said loop opens control the velocity of approach of the platforms toward their associated data mediums during movement of the bridge.

* * * * *

UNITED STATES PATENT AND TRADEMARK OFFICE
CERTIFICATE OF CORRECTION

PATENT NO. : 4,571,648

DATED : February 18, 1986

INVENTOR(S) : Barski

It is certified that error appears in the above-identified patent and that said Letters Patent is hereby corrected as shown below:

Column 8, lines 40-41
Change "swelling" to --swivelling--.

Signed and Sealed this

Fifth Day of August 1986

[SEAL]

Attest:

DONALD J. QUIGG

Attesting Officer

Commissioner of Patents and Trademarks